Nov. 25, 1930. H. A. FOOTHORAP 1,782,757
COMPUTING MACHINE
Filed Aug. 24, 1921 12 Sheets-Sheet 1

Inventor,
Harry A. Foothorap.
By
Attorney

Nov. 25, 1930.  H. A. FOOTHORAP  1,782,757
COMPUTING MACHINE
Filed Aug. 24, 1921    12 Sheets-Sheet 2

Inventor,
Harry A. Foothorap.
By ____ Attorney.

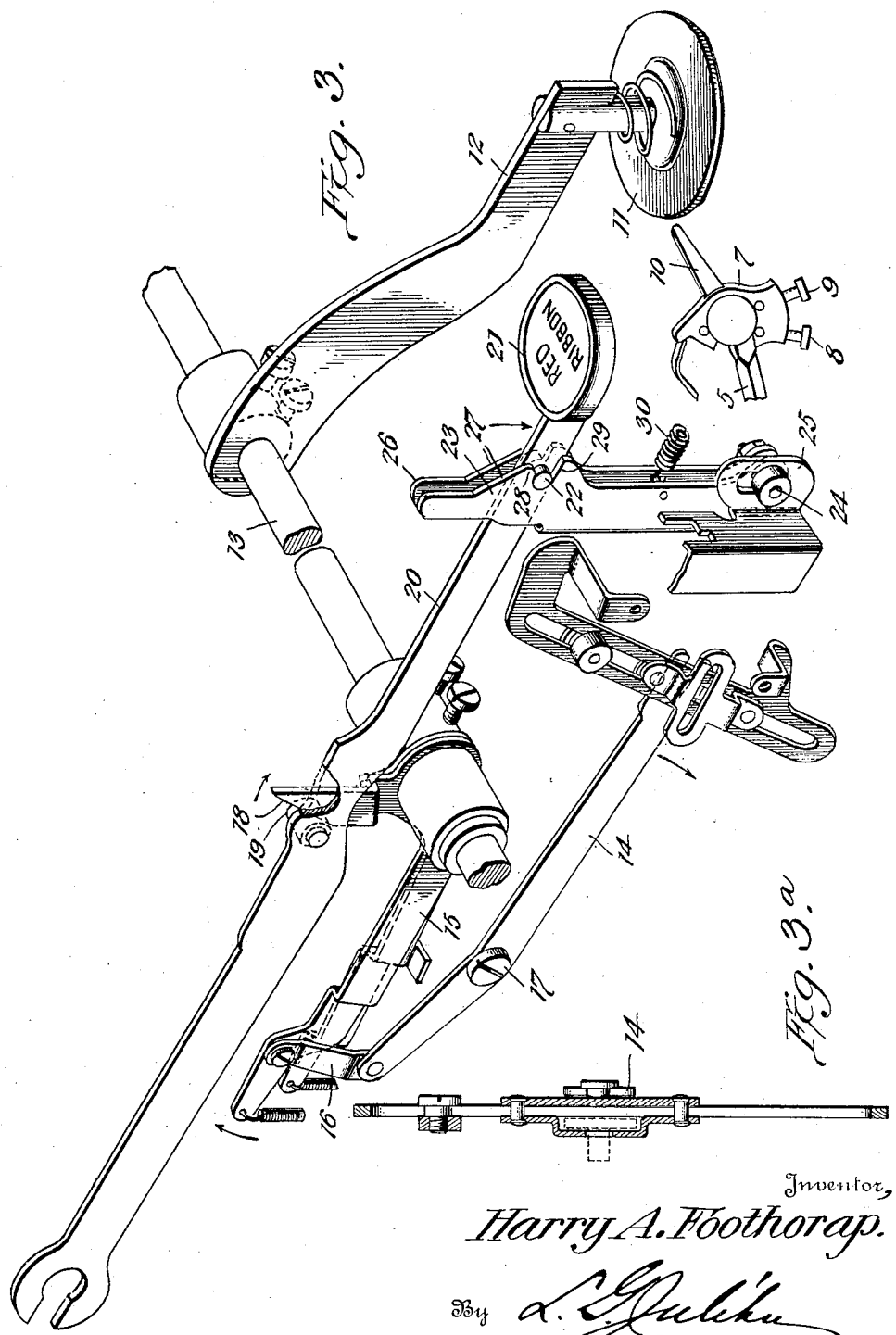

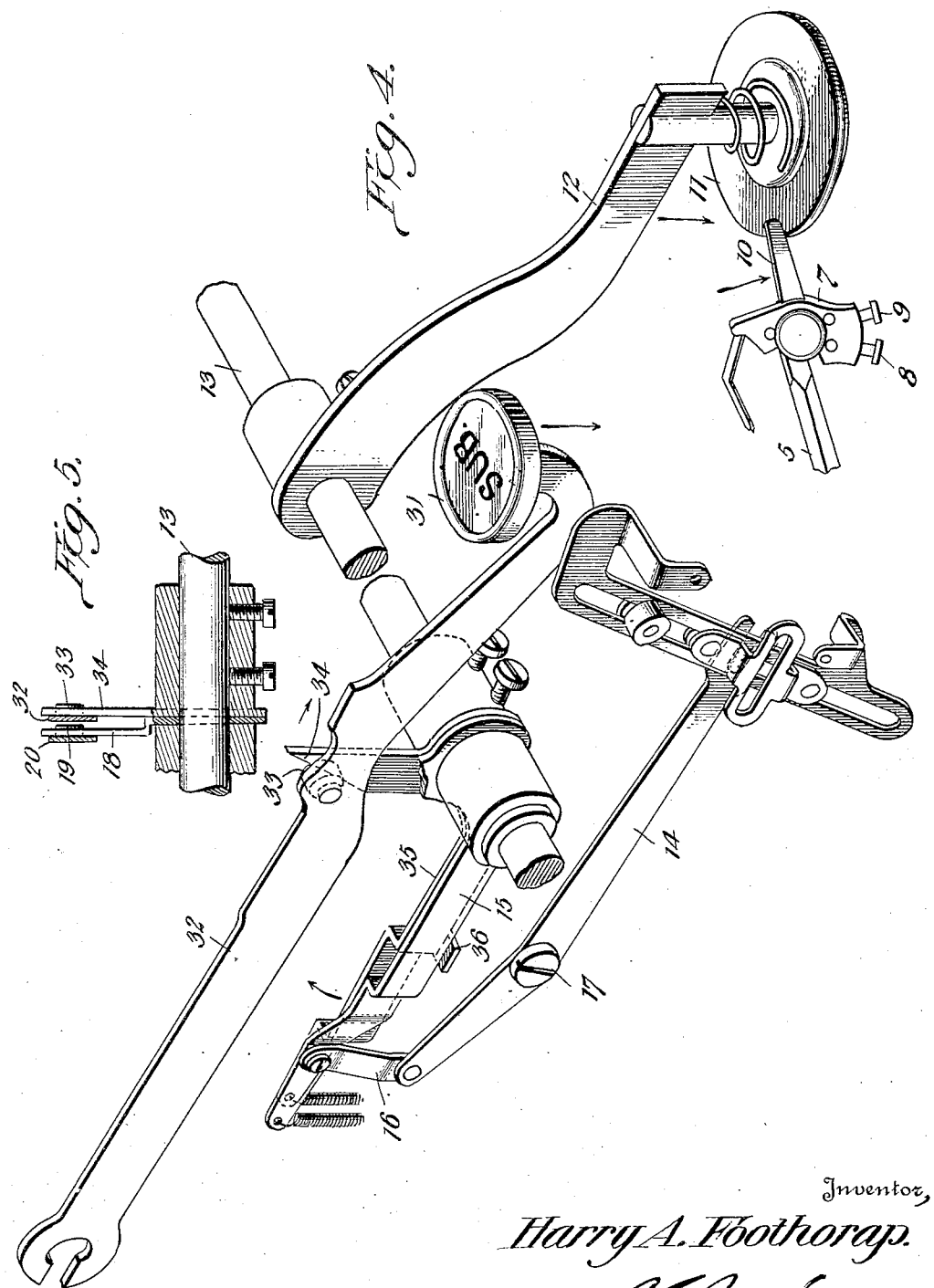

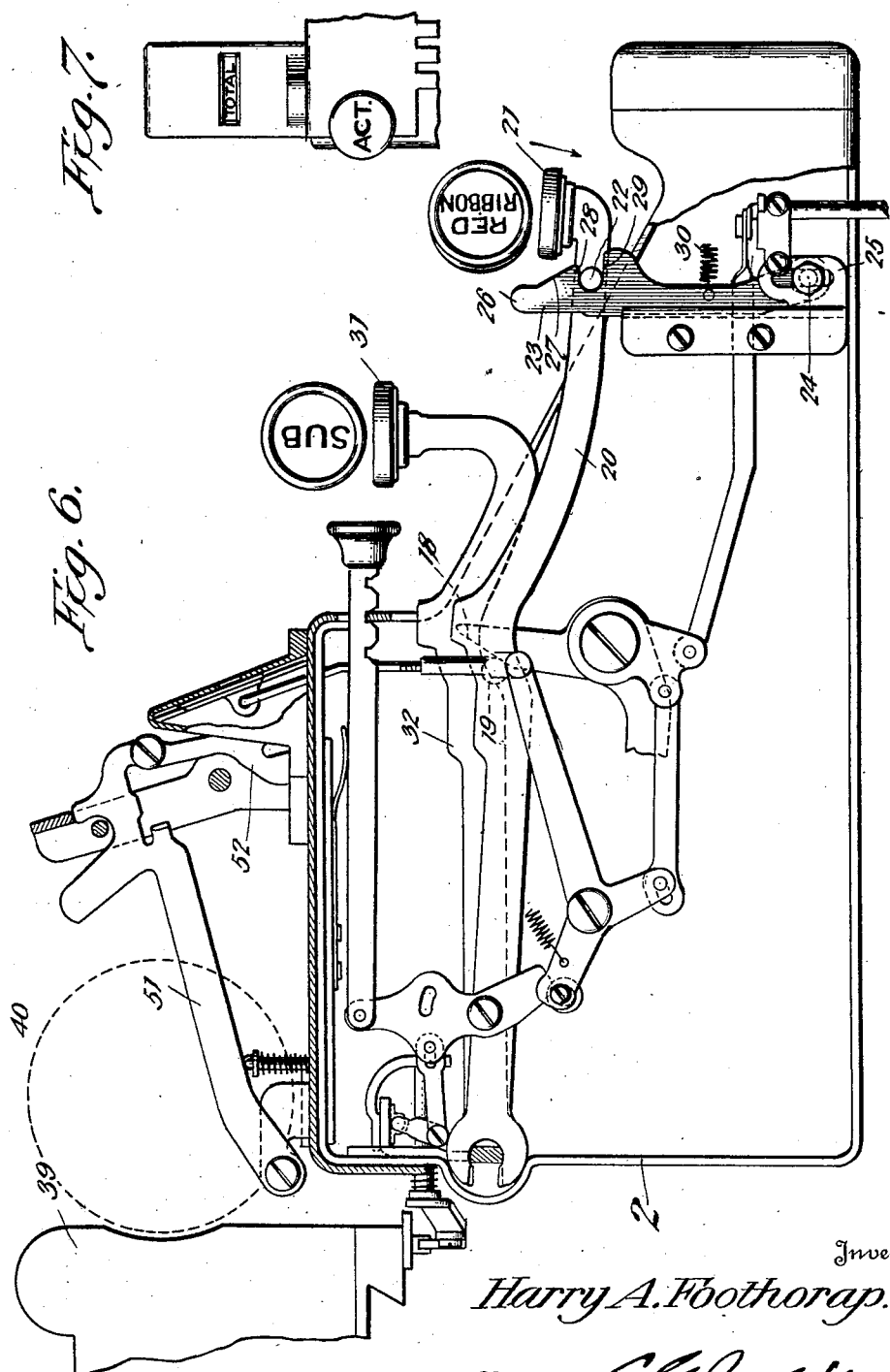

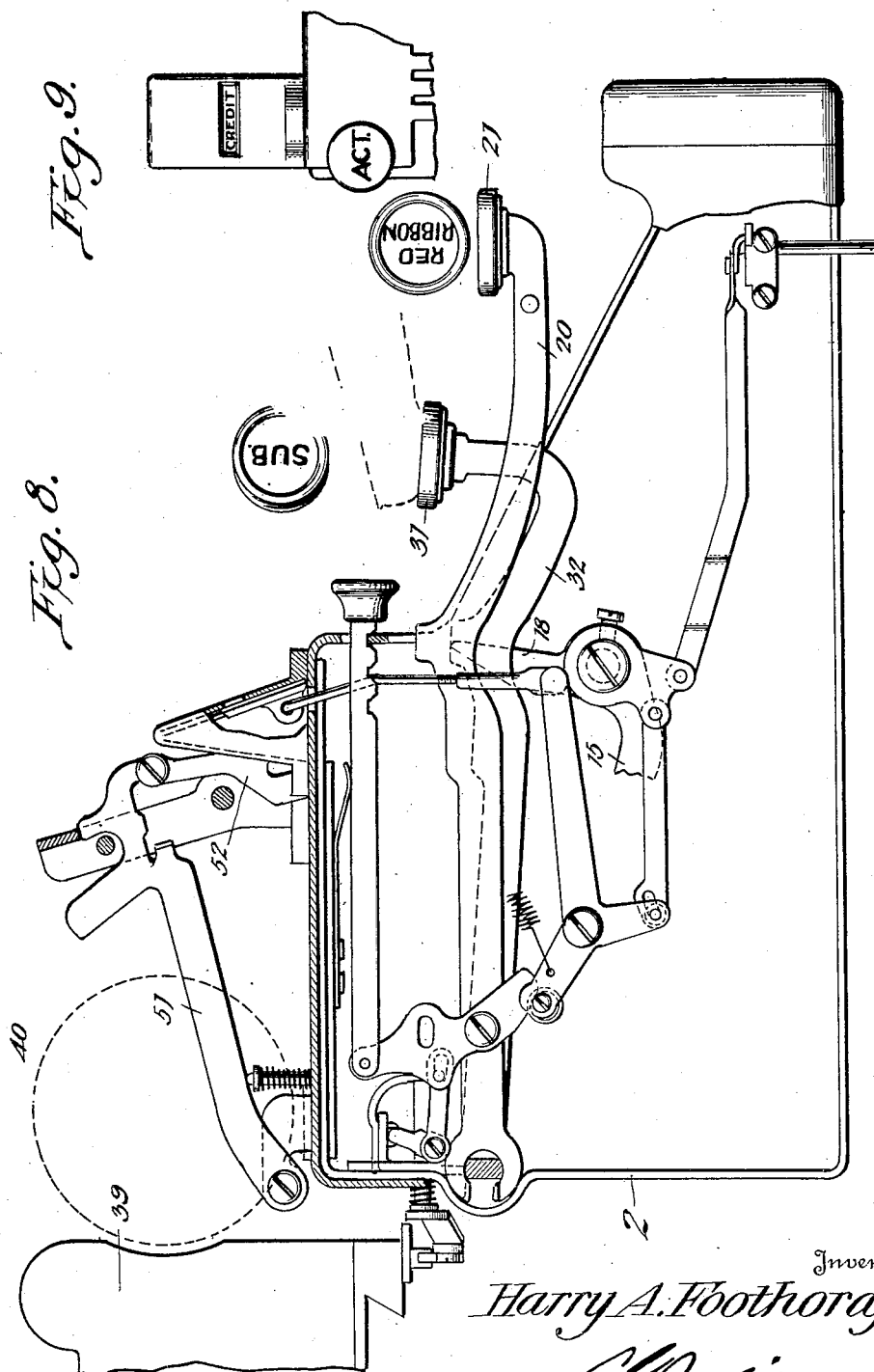

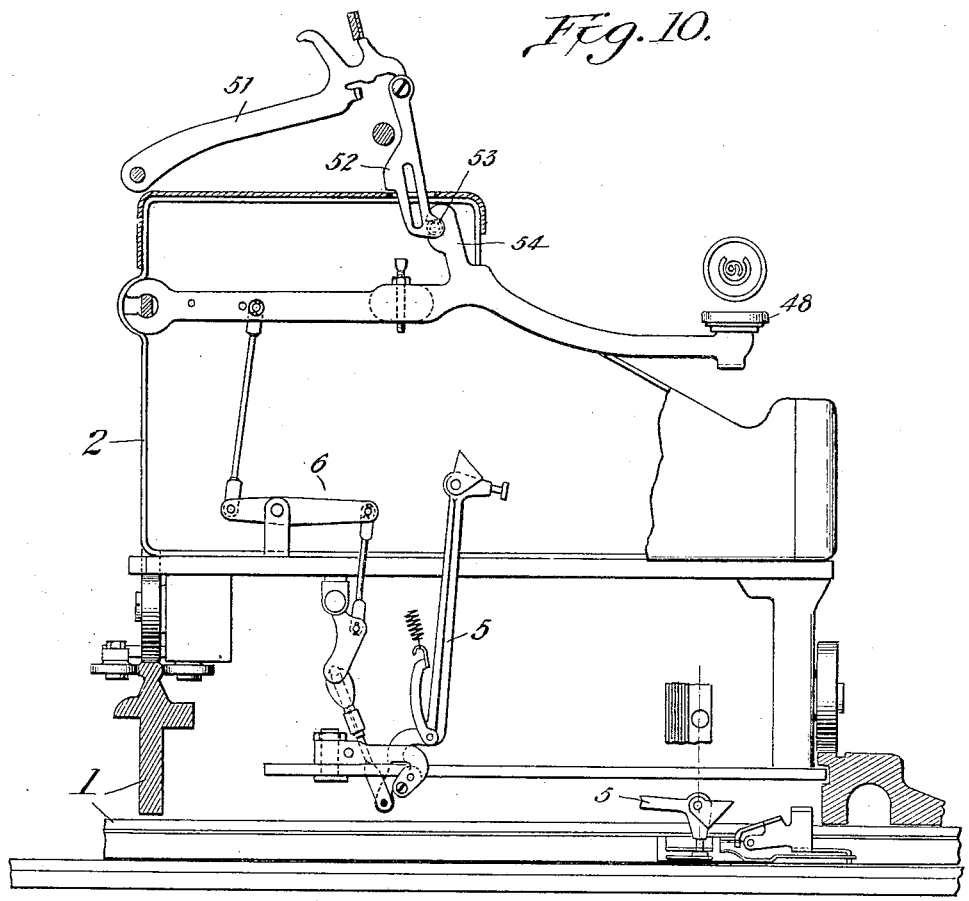

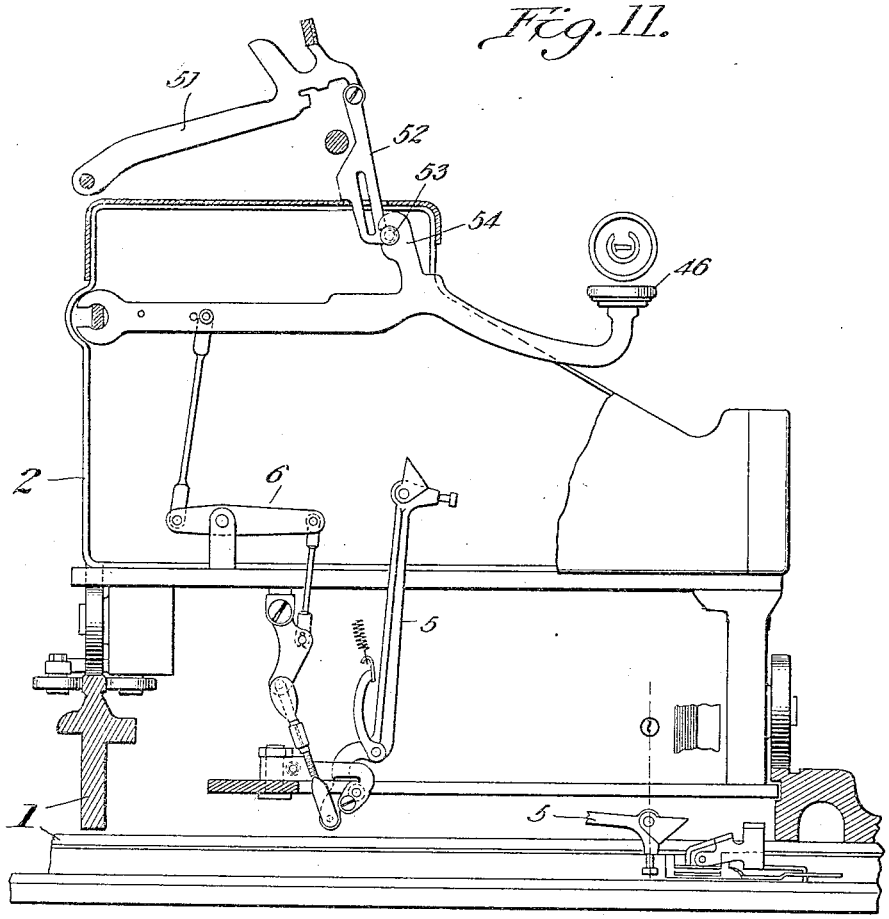

Nov. 25, 1930.   H. A. FOOTHORAP   1,782,757
COMPUTING MACHINE
Filed Aug. 24, 1921   12 Sheets-Sheet 9
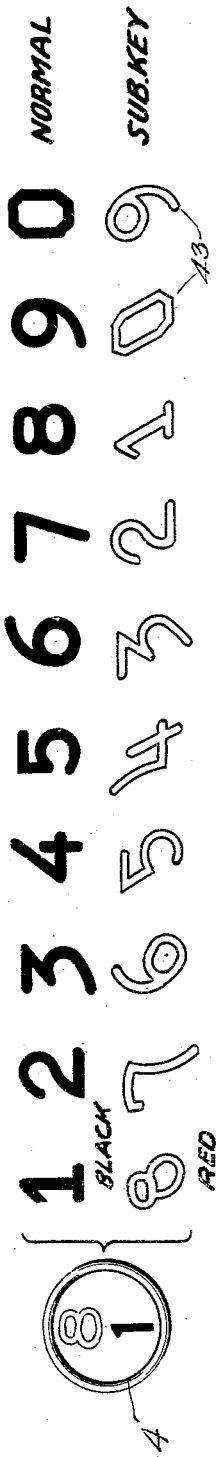
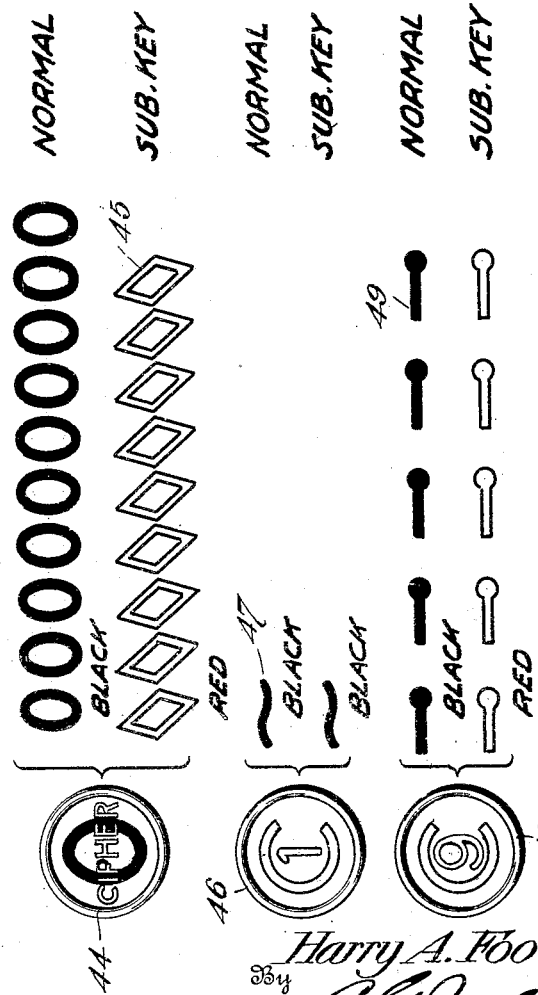
Fig. 12.
Inventor,
Harry A. Foothorap.
By
L. G. Julihn
Attorney Nov. 25, 1930.    H. A. FOOTHORAP    1,782,757
COMPUTING MACHINE
Filed Aug. 24, 1921    12 Sheets-Sheet 10
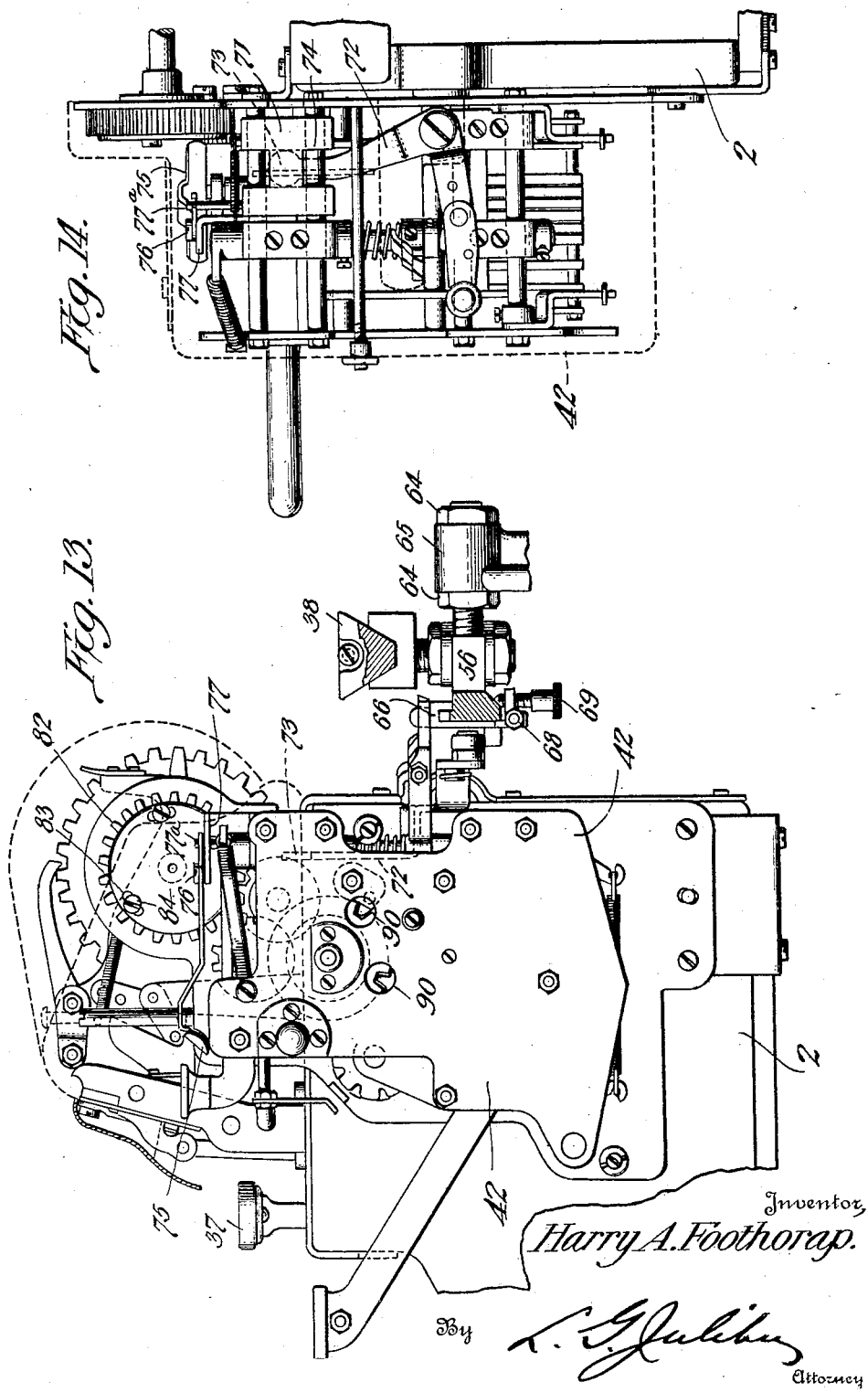
Inventor,
Harry A. Foothorap.
By
Attorney Nov. 25, 1930.  H. A. FOOTHORAP  1,782,757
COMPUTING MACHINE
Filed Aug. 24, 1921  12 Sheets-Sheet 11

Inventor,
Harry A. Foothorap.
By [signature]
Attorney

Nov. 25, 1930.   H. A. FOOTHORAP   1,782,757
COMPUTING MACHINE
Filed Aug. 24, 1921   12 Sheets-Sheet 12
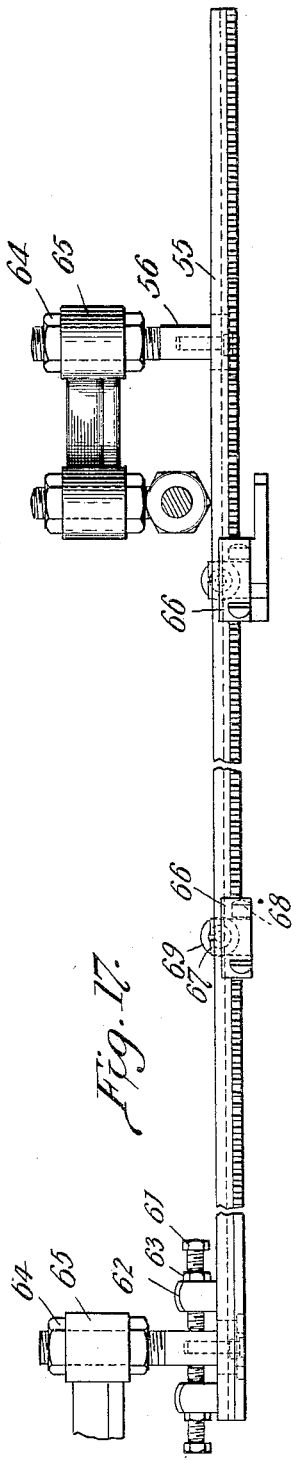
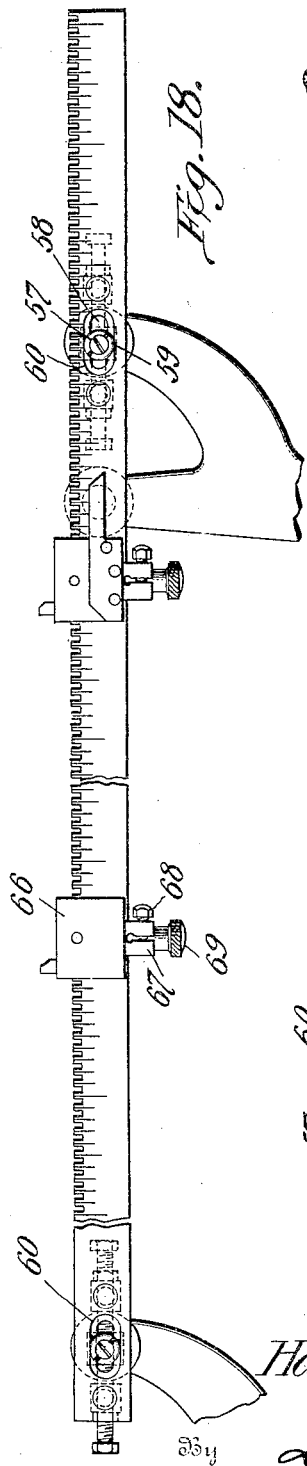
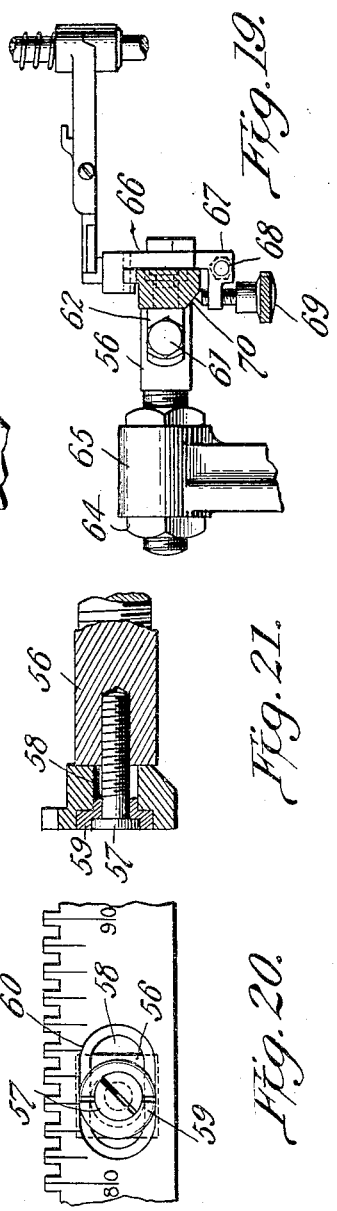
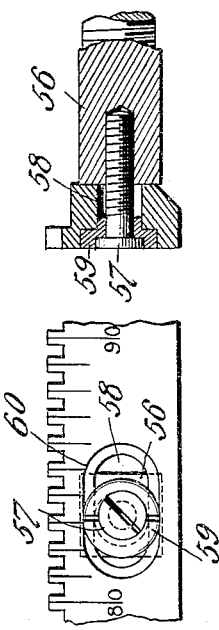
Inventor,
Harry A. Foothorap.
By
Attorney Patented Nov. 25, 1930

1,782,757

UNITED STATES PATENT OFFICE

HARRY ARTHUR FOOTHORAP, OF HARRISBURG, PENNSYLVANIA, ASSIGNOR TO ELLIOTT-FISHER COMPANY, A CORPORATION OF DELAWARE

COMPUTING MACHINE

Application filed August 24, 1921. Serial No. 494,942.

This invention relates to an improved recording and computing machine and, more particularly, to what is known as a writing adding machine.

The primary object of the invention is to provide a machine of this character which will necessarily produce distinctive record proof of every machine operation, whether proper or improper, which could, by any possibility affect the correctness of the computation.

Otherwise expressed, the primary object of the invention, is to provide a visual audit, or proof sheet which will with certainty reveal the character of every machine operation involved in the making of the record, to the end that the mere examination of the record will with certainty reveal an error and disclose the exact character of the erroneous operation involved in producing the record.

To the attainment of the stated object, the invention in its primary aspect comprehends the provision of distinctive recording means for every distinct character of operation involved in the production of a record, so that the record cannot be produced by the operation of the machine without furnishing record proof of every operation performed, whether rightly or wrongly, and thereby furnishing accurate and reliable evidence for an instant audit of the machine operations involved in its production.

Other objects of the invention and the means of their attainment will appear hereinafter.

In the accompanying drawings:

Figure 3 is a perspective view of the red ribbon key and the mechanism associated therewith.

Figure 3ª is a detailed sectional view showing the mounting of the ribbon shifter.

Figure 4 is a perspective view of the subtraction key and associated parts with the trip in position to shift a type head.

Figure 5 is a detailed sectional view showing the relation of the cam members operated by the red ribbon key and the substraction key, to the shaft 13.

Figure 6 is a longitudinal sectional view of the carriage with the red ribbon key depressed for the printing of the total.

Figure 7 is a detailed view of the indicator.

Figure 8 is a view similar to Figure 6 with the subtraction key depressed.

Figure 9 is a view similar to Figure 7 with the indicator in a different position.

Figure 10 is a sectional view showing, more particularly, the additional key for throwing in the 9's and the connection between said key and the recording and computing mechanisms.

Figure 11 is a view similar to Figure 10, but showing the key for throwing in the 1 and its connections.

Figure 12 is a view of each of the keys of the several classes concerned in the operation of subtraction, together with a display of the characters printed by said keys in normal position and the characters printed thereby when the subtraction key has been first depressed.

Figure 13 is a side elevation of the crossfooter.

Figure 14 is a rear elevation of the crossfooter with the casing indicated in dotted lines.

Figure 15:
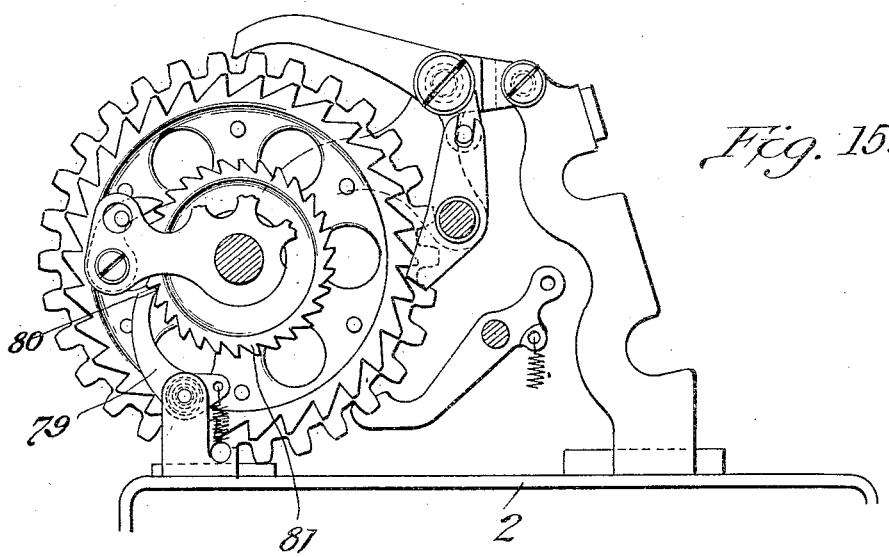
Figure 16:
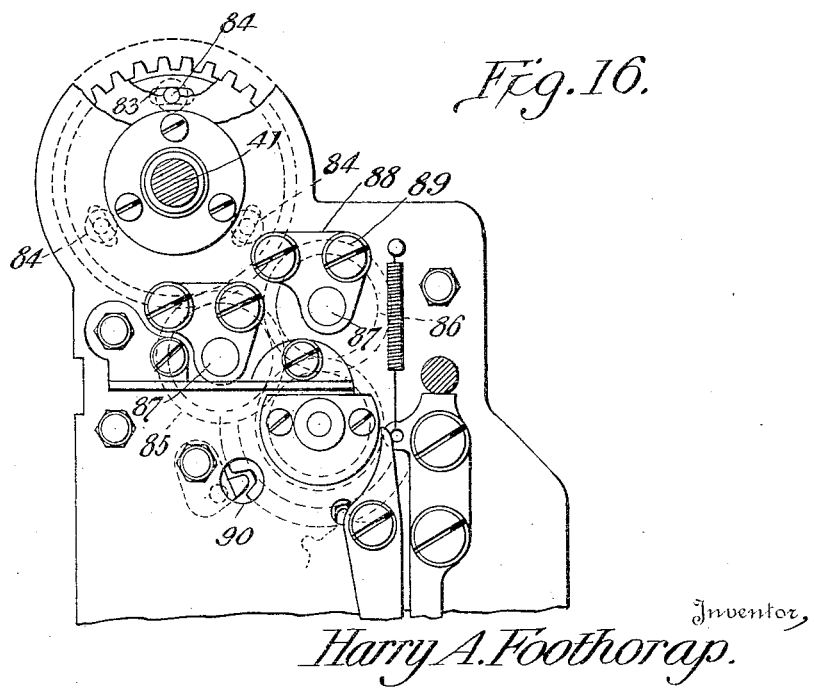

Figures 15 and 16 are elevations of crossfooter details.

Figure 17 is a plan view of the control bar and its associated devices.

Figure 18 is a front elevation of the same.

Figure 19 is a transverse section through the control bar and showing the parts associated therewith in elevation.

Figure 20 is a detailed elevation of one of the control bar adjusting eccentrics.

Figure 21 is a sectional view of the subject-matter of Figure 20.

Figures 1, 22:
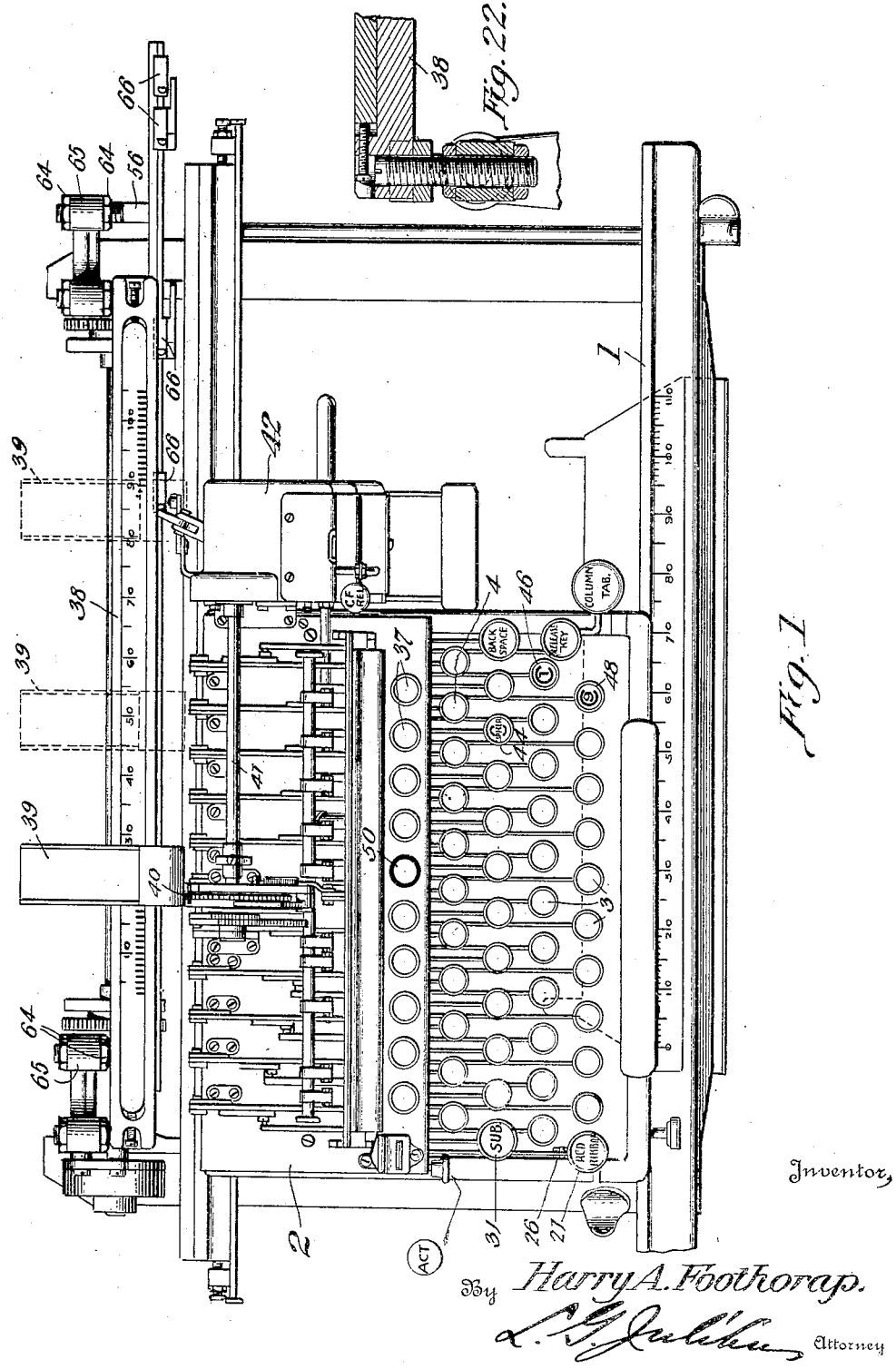
Figure 1 is a plan view of an Elliott-Fisher billing machine constructed in accordance with my invention, the platen and associated parts being omitted.

Figure 22 is a detailed sectional view of one end of the register supporting bar.

The machine to the improvement of which the present invention is more particularly directed is the well known Elliott-Fisher billing machine of commerce. This machine is a flat platen typewriter equipped with computing mechanism. The keys are operated one at a time to record a computation on a work sheet supported in flat spread-out condition on the platen, and as the record is made the computation is effected by computing mechanism under the control of the keys.

The computing mechanism is capable of both addition and subtraction. The subtraction is accomplished by the well known method of complemental addition. This character of subtraction comprehends a special manipulation of the machine because, as is well understood, a series of prerequisites must be observed. First, nine must be added in each denominational position to the left of the highest active digit in order that the excess incident to the carrying operation will be carried beyond the capacity of the register and lost. Second, as the subtrahend is printed, the corresponding denominational members of the register must receive the value not of the digits printed, but of the complements thereof. Third, the value of 1 must be added to the value of the last active digit of the complement of the subtrahend in the same denomination as such active digit occurs; and, fourth, ciphers must be thrown in to the right of the last active numeral without affecting the computing mechanism.

In order that the somewhat extraordinary accomplishment of the present invention may be clearly appreciated, attention is directed to the impossibility, under ordinary conditions, of determining from the printed record whether or not these various operations have been correctly performed at the proper time. First, the throwing in of the 9's produces no record evidence of the operation because this is merely a prerequisite to subtraction by complemental addition and has no place or value in the record of the subtraction. That is to say, these 9's are not in any sense a part of the subtrahend and therefore do not appear on the work sheet. It is usual, therefore, to throw in these 9's by means of a supplemental key which operates the computing mechanism, but does not record the digits. If, therefore, the 9 key is not operated to throw in the 9's at the proper time and the remainder is therefore erroneous to the extent of the excess unit at the left of the remainder, there is nothing on the record sheet to show that an error has occurred by the failure of the operator to throw in the 9's.

Second, it is usual to provide the numeral keys and the type bars operated thereby with a series of digits and a series of complements in lower and upper case positions. For addition, the keys selected in accordance with the normal digits both print and add the same value and the record is black or red accordingly as the items are debit or credit. In subtraction, the keys are selected with reference to their complementary digits and the upper case or corresponding digits are printed while the complements of such digits are added by the computing mechanism. The record of this operation is usually printed in red, but it will be observed that as the distinctive color is not utilized alone for subtraction, the appearance of a red item on the record does not with certainty indicate the character of the operation performed.

Third, ordinarily in throwing in the 1, a non-print key is utilized because, while its value contributes to the accurate remainder, it is not an individual or digital part of the computation and therefore should not appear as such on the record, as it would if the digit 1 should be printed as this value is thrown into the adding mechanism. Another reason for eliminating the printing of this unit value is that it would occur in the same denomination as the last active digit of the subtrahend and would therefore be printed over said last digit. Notwithstanding these good reasons for not printing 1 as it is thrown in, it is nevertheless true that the record bears no indication of whether or not this operation of throwing in the 1 has actually been performed. Obviously, if it has been omitted, the remainder will be inaccurate without means of detecting the error.

Fourth, the printing of the ciphers after the last active digit in the subtrahend is of itself no sufficient evidence that the operation has been performed correctly and has not contributed an error to the computation. The reason for this is that in this class of machines there are usually three ways in which a cipher can be printed. First, by the operation of the 0 or cipher key of the numeral bank which in no way affects the computing mechanism. Second, by operating the 9 key of the numeral bank with the case shift depressed so that while the cipher is printed the value of its complement, or 9, will be accumulated by the computing mechanism. Third, by the operation of the 0 key of the letter keyboard.

In the operation of subtraction, it is material in what way the cipher is printed because, in printing a cipher in the minuend, there must be no operation of the adding mechanism. In printing a cipher in the subtrahend between two active digits, as for instance, in printing $20.55, the computing mechanism must be operated to accumulate the value of 9 which is the complement of the cipher. In printing one or more ciphers at the right of the last active digit of the subtrahend, there must be no operation of the computing mechanism. Obviously, therefore, the mere presence of ciphers in an example of subtraction at the places where the 0's or ciphers should appear, is no evidence that they were printed without error, since it is obvious that a cipher may have been printed between digits of the subtrahend without having accumulated the value of its complement in the computing mechanism, or the ciphers to the right of the last digit may have been printed and the values of their complements improperly accumulated. In either case, the record would reveal no error, but the remainder, as indicated by the computing mechanism, will be entirely wrong.

The object of the invention in its general concept is to cause every essential operation of the machine which can effect the correctness of the computation to so modify the record as to provide a visual audit of the entire machine operation by indicating not only whether or not each necessary operation has been performed, but also whether or not it has been performed correctly or incorrectly.

Proceeding now to a general description of the machine, 1 indicates a line space frame which is movable longitudinally over a flat platen (not shown) to line space the writing on the work sheet supported in flat spread-out condition on the platen. Mounted to travel on the frame 1 in the direction of letter spacing, is a carriage 2 upon which is mounted the usual printing mechanism which includes letter keys 3, numeral keys 4, type arms 5 and the usual intermediate connections 6. The arms 5 connected with the numeral keys have shifting type heads 7, carrying types 8 and 9 in upper and lower position, the normally printing or upper position types being the digits 0 to 9 inclusive, and the lower or shifted position types being the complements of the upper types and ranging from 9 to 0 inclusive. The shifting type heads 7 are provided with tripping fingers 10 which, during the descent of the bars to print, engage a trip 11 in the form of a disk. The trip 11 normally occupies an elevated position in non-interfering relation with the fingers 10 as the bars are operated to print the normal or upper characters. The trip 11 is mounted, however, for vertical movement into and out of active position and when depressed is so located (see Fig. 4) that it will interfere with the finger 10 of a descending bar and shift the type head to bring the lower or complemental type into printing position. The trip 11 is carried to the end of an arm 12 extended from a rock shaft 13 having suitable bearings in the carriage.

The machine also embodies ribbon mechanism which supports, feeds and vibrates a bichrome ribbon, the stripes of which are preferably black and red. Except as will be pointed out, this ribbon mechanism is of usual form, as disclosed in my Patent No. 1,286,573 of Dec. 3, 1918, and in my copending application No. 434,248. The principal variation over the application structure is in the mechanism for controlling the depression of the trip 11 and for operating the slide shifting arm of the ribbon mechanism.

The slide shifting arm 14 which, as is well understood, controls the throw of the ribbon and thus determines whether the red or black stripe thereof will be presented at the printing point, is clearly shown in Figures 3 and 4. Loosely fulcrumed on the shaft 13 and extended rearwardly therefrom is an arm 15 connected by a link 16 with the rear end of the slide shifting arm 14 which is fulcrumed at 17. Associated with the arm 15 is a cam 18 adapted to be engaged by a roller 19 on a red ribbon lever 20 fulcrumed at its rear end and provided at its front end with a red ribbon key 21. When the key 21 is depressed, the roller 19 coacting with the cam 18 will swing the cam to elevate the arm 15 and thus swing the slide shifter 14 to organize the ribbon mechanism for the presentation of the red stripe of the ribbon at the printing point. Adjacent to the key 21, the lever 20 is provided with a pin 22 engaged by a key lock 23. The key lock 23 is fulcrumed at its lower end on a stud 24 adjustably retained by a slotted bracket 25. At its opposite end the lock 23 is provided with a finger piece or key 26 below which is a cam 27 constituting the upper edge of a beak 28 disposed above a stop 29. When the red key lever is depressed, the pin 22 engaging the cam 27 forces the lock 23 backward until the pin 22 dropping from the cam is arrested by the stop 29 and the lock is drawn forward to present the beak over the pin 22 by a spring 30. It will thus be seen that the locking action is automatic and in order to unlock the key, it is merely necessary to move the finger rearwardly over the red ribbon key until the lock is pushed back sufficiently to allow the key to rise.

The mechanism just described makes it possible to print in red when desired as, for instance, in printing credit items which are added, as usual, without shifting the type or otherwise varying the normal operation which contemplates the printing of items in black and the accumulation of the same items by the computing mechanism. In subtraction, by addition, however, the complementary types are employed, therefore necessitating a case shift and it is usual in subtraction to print the items in red. Heretofore, this has been done by separately operating the case shift and the ribbon shift, and in my copending application before mentioned, automatic mechanism is disclosed for operating both the case shift and the ribbon shift. In the present machine, however, I employ in addition to the red ribbon key described, a second key known as the subtraction key 31 carried at the front end of a subtraction key lever 32 provided with a roller 33 coacting with a cam 34, similar to the cam 18, associated with an arm 35 disposed parallel with the arm 15. Unlike the cam 18 and arm 15, which swing loosely from the shaft 13, the cam 34 and arm 35 are fixed to the shaft 13 so that upon the depression of the subtraction key 31, the cam 34 will be moved forward to accomplish two results by the rocking of the shaft 13. First, the depression of the arm 12 and trip 11 into active position; and, second, the elevation of the arm 35 to shift the ribbon to the red position. The connection responsible for the latter result is in the form of a lug 36 projecting from the arm 35 and underlying the arm 15. It will thus appear that while the red ribbon lever may be depressed without in any way affecting the case shift, since the arm 15 will rise away from the lug 36, the depression of the subtraction key will necessarily result in both a case and ribbon shift by a single operation.

Returning now to the general description after having digressed at a convenient point to describe the new method of case and ribbon control, it may be said that the machine includes in its organization the various appurtenances of a typewriter, such, for instance, as carriage feeding mechanism, tabulating mechanism including tabulator keys 37, carriage release mechanism, etc., etc.

In rear of the carriage 2 and supported by the frame 1 is what is known as a register supporting bar 38 carrying one or more computing devices or registers 39. Each of these registers embodies a series of number wheels occupying different denominational positions and intermediate carrying mechanism. As the digits are printed on the work sheet the number wheels in corresponding denominational position will be operated to an extent corresponding to the values of the digits. When the limit of value of each denomination is reached, such value is transferred to the wheel of next highest order as a single unit of that denominational value. The number wheels are operated by a master wheel 40 mounted on and movable with the carriage and connected to the keys by means of what are known as differential connections which transmit to the master wheel a rotary movement corresponding in extent to the value of the particular numeral key operated. In some forms of the Elliott-Fisher billing machine, the shaft 41 of the master wheel or actuator 40 is extended to one end of the carriage to operate what is known as a cross-footer 42 which need not be specifically described at this point.

Having in mind the general arrangement of the machine, we may now consider the provision that has been made for securing the visual audit by the production of a record sheet which will bear unmistakable evidence of the operations performed or omitted and disclose not only errors of omission and commission, but reveal with certainty the exact nature of the errors and the points at which they were committed. In the first place, (see Fig. 12), the complemental types 43 are of distinctive character, so that an item printed by the use of the complemental characters are clearly distinguishable from the normal digits. Thus, a glance at the subtrahend of an example in subtraction will show conclusively whether or not the subtraction key had been operated to change the case. Quick inspection is also facilitated by the fact that the operation of the subtraction key to bring the complements into action also caused the record to be printed in red. The distinguishing color, however, is not sufficient safeguard, because, as we have seen, the credits are printed in red with the normal type in use. The printing of the subtrahend, however, in both distinctive type and a distinctive color constitutes a means of quickly determining whether or not the subtract key was properly operated before the subtraction was attempted.

Next comes the provision for the detection of the troublesome 0 or cipher and the determination of whether or not the printing of a cipher between two digits of the subtrahend or after the last digit of the subtrahend did or did not involve an erroneous operation. To secure this result, the type head operated by the 0 key 44 of the letter bank is equipped with a shifting type head, such as is shown in Figure 4, and is equipped with the usual 0 in normal position and with a diamond-shaped or other distinctive cipher 45 in abnormal position. This cipher is distinct from either the letter O, the normal cipher, or the complemental cipher which is associated with the normal 9 digit. Therefore if in printing the subtrahend of a subtraction, a cipher other than the easily distinguishable complementary cipher appears between two digits, it is at once evident that the computation is erroneous because, when such other cipher was printed, the complement 9 was not thrown into the computing device, since no other key capable of printing a cipher could affect the computing mechanism. In like manner, the occurrence of diamond-shaped ciphers after the last digit of the subtrahend is conclusive evidence that the computing mechanism was not affected by the printing of these ciphers as would be the case if the record showed the other form of cipher which it would be possible to print with the sub-key depressed, to wit, the complementary cipher.

The means for auditing the operation of the 1 key 46 which is ordinarily a non-print non-feed key for the reasons heretofore discussed, comprehends the provision of a type head operated by this key and provided with an underscore 47 preferably in the form of a compound curve, as shown, and arranged, when the key is depressed, to make an impression of the underscore immediately below the last digit of the subtrahend. This result is secured by operating the key 46 when the carriage has reached the position to be occupied by the last digit of the subtrahend, but before said last digit is printed. Since this key 46 has no connection with either the ribbon mechanism or the carriage feed mechanism, the carriage will not feed forward when the underscore has been printed and the carriage will remain in proper position for the printing of the last digit. No printed impression of the underscore will appear on the top sheet which may be the bill. On the subjacent sheet or sheets, however, including what is known as the proof sheet or the visual audit sheet, a carbon impression of the underscore will clearly appear, so as to reveal with certainty the fact that the operator threw in the 1 at the proper time. The securing of proof of the proper throwing in of the 9's is secured by providing a special 9 key 48 with a type head designed to print a distinctive designation 49 which I have shown as a combined dot and dash so that if the 9's have been properly thrown in, a continuous dot and dash line will extend to the left of the highest digit of the subtrahend. If the subtract key has been operated, this indication of the throwing in of the 9's will appear in red. Should it appear in black, the computation will not have been affected, but the black color of these designations will disclose the fact that the subtract key had not been properly depressed for a subtraction operation and will indicate the desirability of carefully checking the remaining operations.

Another distinctive feature of the present invention which, while not directly contributing to the production of a visual audit, is of material value in the expeditious and accurate operation of the machine, is a distinctive tabulator key 50 distinguishable from other tabulator keys of the series 37 by its contrasting color or the contrasting color of its band, or other part calculated to catch the eye of the operator. This distinctive tabulator key may be located at any point in the series according to the capacity of the registers employed.

The object is to provide a distinctive tabulator key for operating the before mentioned carriage release mechanism to release the carriage for subsequent arrest by the usual tabulator stops (not shown). This operation, as will be understood, positions the master wheel in any desired predetermined relation to the next register as, for instance, opposite the number wheel of highest order.

In Figures 10 and 11 is shown a detail to which attention should be directed, to wit, the character of the connection between the levers of the keys 46 and 48, for throwing in the 1 and the 9's, with the actuating mechanism. Heretofore, the levers 51 of the actuating mechanism have been capable of operation by non-print keys mounted thereon. These non-print keys have now been entirely eliminated since no operation of the machine without record proof of the operation is now contemplated. To permit the non-print operation, the levers 51 have been heretofore provided with links 52 having pins 53 engaged by hooks formed on the key levers. By this arrangement, the depression of the key levers would draw down the actuator levers through the instrumentality of the hooks which, however, would permit the links to drop independently of the hooks during the non-print operation. The total elimination of the non-print operation makes it possible to now establish a positive two-way connection between the key levers and the links. This connection, as shown in the figures mentioned, embodies a U-shaped catch 54 carried by the levers in place of the hooks and engaging the pins 53. It will also be noted that the location of these keys, and particularly the 9 key considerably in advance of the bank of numeral keys where they have been ordinarily located, considerably lengthens the key levers and materially increases the leverage. This is particularly desirable in connection with the throwing in of the 9's as the key touch is rendered extremely light.

As shown in Figure 1, the registers which constitute the computing devices of the machine under discussion are not provided with the usual resetting levers, by means of which the number wheels are ordinarily reset to the zero position. This elimination makes it impossible to change the reading of the register or registers except by manipulation of the keys. The register reading therefore necessarily conforms with the audit obtained from the record sheet indicating the correct answer, if the audit shows all operations to have been correctly performed, and correspondingly indicating the wrong answer to the extent of any error or errors committed by the operator and likewise disclosed by the record proof.

In Figures 17 to 21 inclusive are shown some specific improvements in the control mechanism for the crossfooter. This control mechanism is disclosed in my copending application No. 434,254. The toothed control bar 55 is drawn against the flat ends of the horizontal supporting posts 56 by screws 57 passed through longitudinal slots 58 in the bar and associated with eccentrics 59 located within elongated seats 60 formed in the front face of the bar 55. The eccentric 59 constitute means for securing slight vertical adjustment of the control bar and also constitute leveling means, since they are capable of independent adjustment. Longitudinal adjustment of the bar 55 is effected by abutment screws 61 passed through lugs 62 on the rear side of the bar and bearing against opposite sides of one of the posts 56. Locked nuts 63 serve to lock the abutment screws securely in adjusted position to rigidly retain the bar. Horizontal lateral adjustment of the control bar is effected by means of nuts 64 screwed upon the posts 56 at opposite sides of the supporting bracket 65. The illustrated mounting for the control bar obviously affords every necessary character of adjustment of said bar while insuring its absolutely rigid retention in any position to which it may have been adjusted. The control blocks 66 have their lower ends 67 split longitudinally to constitute what is in effect a lock nut which may be drawn up by the lock screws 68 to securely grip and lock a block retaining screw 69 which passes through the split portion of the block and engages the incline face 70 at the lower rear corner of the control bar 55.

Another specific improvement resides in an improved connection between the gear shifter 71 of the crossfooter (see Fig. 14) and the bell crank lever 72, which operates the same. In place of the slot and pin connection heretofore employed, the upper end of the bell crank 72 terminates in a circular or spherical bearing member 73 located between two vertical walls 74 of the shifter and constitutes what is in effect a ball bearing between the shifter and lever.

Figure 2:
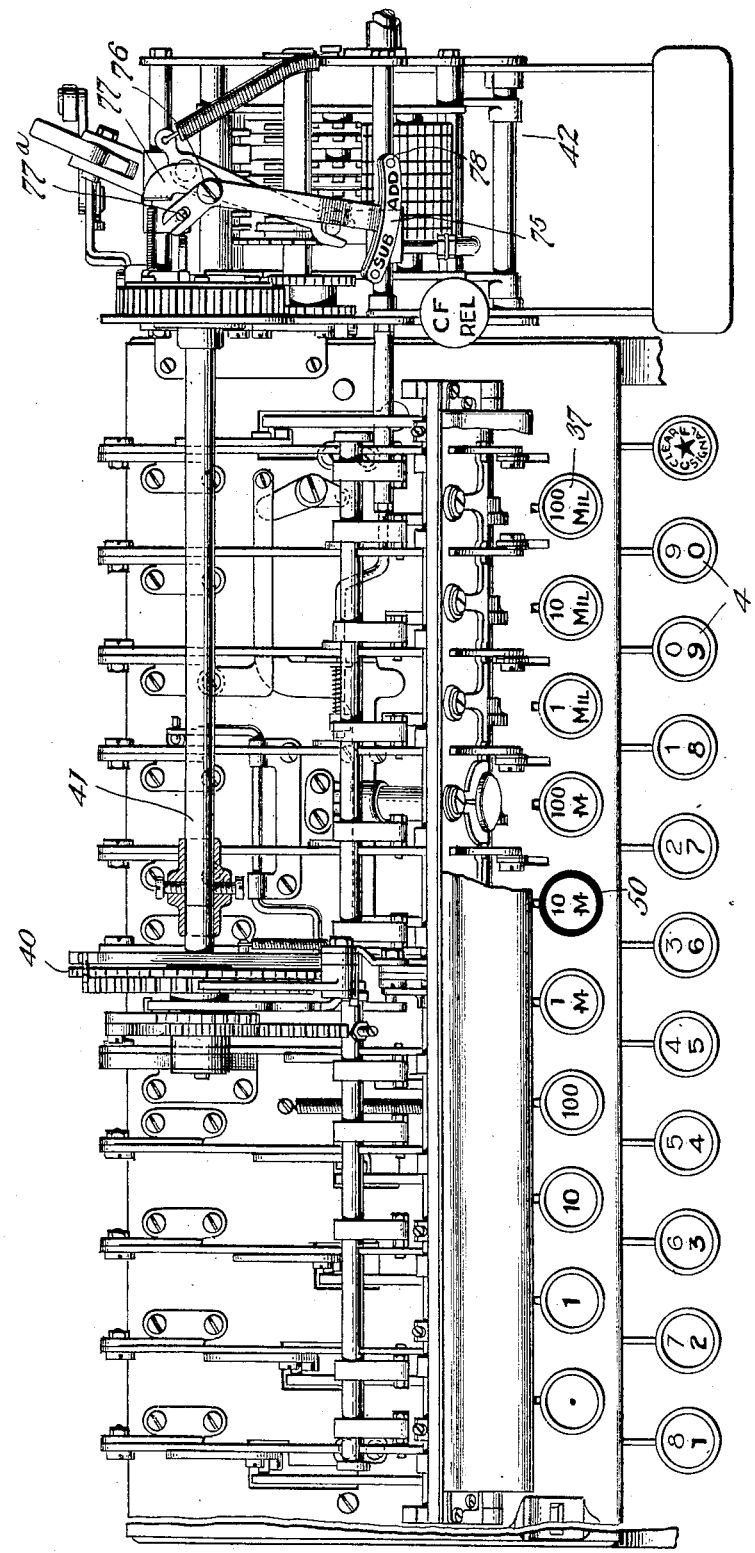
Figure 2 is a view, on a somewhat enlarged scale, of the actuating mechanism of the crossfooter.

Furthermore, an improved crossfooter indicator 75 (see Fig. 2) is provided to indicate whether the crossfooter is set for addition or subtraction. This indicator is in the form of a horizontally disposed lever fulcrumed at 76 on a bracket 77. At its rear end, the indicator lever has a slot and pin connection 77ª with the gear shifter 71 and at its front end has an indicating plate 78 located at the front of the crossfooter and bent at a proper angle to present the designations "Sub" and "Add" to the eye of the operator. It will of course be understood that these designations are presented alternately in the reading position accordingly as the gear shifter occupies the add or subtract position.

In Fig. 15 is shown a detailed improvement in the actuating mechanism. This improvement consists in providing two check pawls 79 and 80, one longer than the other, for coacting respectively with the driving ratchet 81 of the master wheel and affording a firm full tooth grip at both full and half notched positions.

Finally, the adjustment of the gears of the crossfooter is facilitated by mounting the actuator driving gear 82 of the crossfooter for slight adjustment on its axis by means of concentric slots 83 and adjustment screws 84. The intermediate gears, to wit, the shift gear 85 and the idle gear 86 are mounted on studs 87 extended from universally adjustable gear carrying plates 88. These plates are retained by screws 89 passed through openings in the plates of sufficient size to enable the plates when the screws are loosened, to be adjusted in any direction necessary to the accurate locating of the gears. The adjustment is greatly facilitated by the provisions of sight holes 90 at appropriate points in both side walls of the crossfooter casing to permit the adjuster to observe the relation of the gears to each other and to adjacent parts while the adjustment is being effected.

It is thought that from the foregoing, my present invention will be clearly understood, but I reserve the right to effect such modifications and variations as may come fairly within the scope of the protection prayed.

What I claim is:—

1. In a machine of the character described, the combination with an adding mechanism, of recording mechanism including keys operating said mechanisms to record and accumulate the value of a minuend, and to record a subtrahend and accumulate the value of the complement thereof, said mechanisms including means for eliminating the excess value incident to such accumulation and for recording the fact of such elimination, and also including means for accumulating the amount of the deficit incidental to subtraction by addition and for recording the fact of such accumulation.

2. In a recording and adding machine, the combination with a register, of printing mechanism arranged to print a number or the complement thereof, means for operating the printing mechanism and the register to print a number and accumulate the value thereof and also to print a number and accumulate the complement thereof, and a supplemental key operative to effect accumulation of an unrecorded value in the register and to record the fact of such accumulation in the proper denominational position on the record.

3. In a recording and adding machine, the combination with a register, of printing mechanism arranged to print a number or the complement thereof, means for operating the printing mechanism and the register to print a number and accumulate the value thereof and also to print a number and accumulate the complement thereof, and a plurality of supplemental keys operative to accumulate different unrecorded values in the register and to distinctively record the fact of such accumulations in the proper denominational positions on the record.

4. In a recording and adding machine, the combination with a register, of printing mechanism arranged to print a number or the complement thereof, means for operating the printing mechanism and the register to print a number and accumulate the value thereof and also to print a number and accumulate the complement thereof, and a supplemental 1-key operative to accumulate in the register a unit of any desired denominational value and to produce record proof of the accumulation of such unit of value.

5. In a recording and adding machine, the combination with a register, of printing mechanism arranged to print a number or the complement thereof, means for operating the printing mechanism and the register to print a number and accumulate the value thereof and also to print a number and accumulate the complement thereof, and a supplemental 1-key operative to accumulate in the register a unit of any desired denominational value and to record a character sign contiguous to but removed from a digit printed in the same denominational position.

6. In a recording and adding machine, the combination with a register, of printing mechanism arranged to print a number or the complement thereof, means for operating the printing mechanism and the register to print a number and accumulate the value thereof and also to print a number and accumulate the complement thereof, and a supplemental 1-key operative to accumulate in the register a unit of any desired denominational value and to underscore a digit printed in the same denominational position.

7. In a recording and adding machine, the combination with a register, of printing mechanism arranged to print a number or the complement thereof, one digit at a time, means for operating the printing mechanism and the register to print a number digit by digit and to simultaneously accumulate and register the value thereof, and also to print a number and accumulate the complement thereof in the register in like manner, and a supplemental 9-key operative to accumulate one at a time in the register, nine unrecorded units of any desired denominational value and to record a character sign in any denominational position in which such accumulation occurs.

8. In a recording and adding machine, the combination with a register, of printing mechanism arranged to print a number or the complement thereof, means for operating the printing mechanism and the register to print a number and accumulate the value thereof, a supplemental 1-key operating the register to accumulate a single unit of any denominational value, and a supplemental 9-key operating the register to accumulate nine units of any desired denominational value, and means for recording in corresponding denominational positions indications of any accumulations effected by the operation of the supplemental keys.

9. In a machine of the character described, the combination with adding mechanism and recording mechanism, of keys some of which are operative to cause the adding mechanism to accumulate the value of a minuend and the value of the complement of a subtrahend, others of said keys effecting the additional value of nine in each denominational position to the left of the subtrahend and the additional value of one in the denominational position of the last digit of value in the subtrahend, such operation of the keys also operating the recording mechanism to produce a contrasting record of the minuend and subtrahend and to record sign characters in the denominational positions in which the additional values of nine and one have been accumulated.

10. In a machine of the character described, the combination with adding mechanism, recording mechanism including two series of numeral types of different character and also including two sign characters, and selective means for determining the color of the record, of keys some of which operate said mechanisms to record a minuend and subtrahend in different types and in contrasting colors and to accumulate the value of the minuend and the value of the complement of the subtrahend, others of said keys being operative one to effect accumulation of the value of nine and to record a sign character in each denominational position to the left of the subtrahend, and another to effect accumulation of the value of one and record a sign character in the denominational position of the last digit of value of the subtrahend.

11. A machine of the character described, including adding mechanism and recording mechanism operative one to record a minuend and subtrahend and the other to accumulate the value of the minuend and the value of the complement of the subtrahend, said recording mechanism including separate means for recording distinctive ciphers one only of said means serving to cause the accumulation of a complemental value.

12. A machine of the character described, including adding mechanism and recording mechanism operative one to record a minuend and the other to accumulate the value of the minuend and the value of the complement of the subtrahend, said recording mechanism including distinctive lower and upper case types for distinctively recording the minuend and subtrahend and also including ciphers of different form for use respectively as active and inactive digits of the subtrahend.

13. A machine of the character described, including adding mechanism and recording mechanism operative one to record a minuend and the other to accumulate the value of the minuend and the value of the complement of the subtrahend, said recording mechanism including distinctive types for distinctively recording the minuend and subtrahend and also including in addition to the usual letter types, ciphers of different form, one for use as the complement of a value accumulated during the recording of the subtrahend and the other for use after the last digit of value of the subtrahend.

14. A machine of the character described, including adding mechanism and recording mechanism, said recording mechanism including distinctive type for recording the minuend and subtrahend of a problem in complemental subtraction, distinctive ciphers for active and inactive inclusion in the subtrahend, a character sign for recording the throwing in of the value of nine in each denominational position to the left of the subtrahend, and a character sign to be recorded in the denominational position of the last active digit in the subtrahend to indicate the accumulation of an extra unit of value.

15. A machine of the character described, including adding mechanism adapted to accomplish subtraction by addition by accumulating the value of the minuend, the value of the complements of the digits recorded in the subtrahend, the value of nine in each denomination of higher order than the subtrahend and an additional unit of value in the denomination of the active digit of lowest order in the subtrahend, and recording mechanism arranged to record the minuend and subtrahend in characters of different color and form, to record active and inactive ciphers of different form in the subtrahend, to record a sign for each accumulation of higher order than the subtrahend and to record a sign of the accumulation of the extra unit of value.

16. In a machine of the character described, the combination with a key disposed for depression by the imposed finger of an operator, of a locking device arranged to automatically lock the key in depressed position and located adjacent to the key to be released by the finger of the operator when located in normal operating position over the key.

17. In a machine of the character described, the combination with a depressible key, a key lever and a pin carried by the lever, of a key lock spring-urged in one direction and having a cam engaged by the pin to move the lock out of the path of the pin during the descent of the lever, said key lock being extended above the key to be engaged by the end of a finger in operative position on the key.

18. In a machine of the character described, the combination with a computing device operated for addition and subtraction, of an indicator in the form of a lever mounted over the computing device and carrying at its front end an indicator plate carrying appropriate designations.

19. In a machine of the character described, the combination with a computing device, of an actuator therefor, operating means for the actuator including a driving pawl and a driving ratchet, and a plurality of check dogs coacting with the ratchet, and of different lengths to afford a full tooth grip on the actuator at both full and half notch positions.

20. In a machine of the character described, the combination with supporting brackets, adjustable posts carried thereby, adjustable eccentrics carried by the posts, a control bar carried by the eccentrics, and opposed adjusting screws coacting with the posts and control bar to effect the adjustment of the control bar longitudinally in either direction.

21. The combination with a control bar, of a control block mounted thereon and having a bifurcated portion, a retaining screw carried by the bifurcated portion of the block and engaging the bar, and a locking screw arranged to draw up and lock the bifurcated portion of the block upon the retaining screw.

22. In a machine of the character described, the combination with adding mechanism, of recording mechanism including two series of digit types of distinctive form but like value and means for causing the types to print digits one at a time and to simultaneously accumulate and register in the adding mechanism the value of the digit printed or the complemental value of the digit printed accordingly as the particular type operated belongs to one or the other of the two series, a two-color ribbon arranged to present either color at the printing point and a single key operative to select a particular series of type and a particular ribbon color, whereby the minuend and subtrahend of a problem in subtraction may be printed and registered one digit at a time in distinctive colors and in distinctive type.

23. In a machine of the character described, adding mechanism, mechanism for manually operating the adding mechanism to add or to subtract by complemental addition, to eliminate the excess value and accumulate the deficit incident to such subtraction, and recording mechanism under control of said operating mechanism and including recording devices symbolizing on a record performance of each of the above recited operations coincidentally with their accomplishment in the adding mechanism.

24. In a machine of the character described, adding mechanism, mechanism for manually operating the adding mechanism to accumulate a number and to add the complements of another number thereto, recording mechanism under control of the operating mechanism, and separate means operatively associated with the adding and recording mechanisms for causing the addition in the adding mechanism of an unrecorded value of a given denomination and for recording the fact of its operation in the proper denominational position on the record.

25. In a machine of the character described, the combination with adding mechanism, a platen for supporting a manifold record, and recording mechanism including a ribbon and number keys, of a supplemental number key operating the adding mechanism to accumulate a value therein and also operating to impress a sign character against the record adjacent the printing point of the machine and spaced from the ribbon whereby said character sign is caused to appear on the under sheets of the manifold record only.

In testimony whereof I hereunto affix my signature.

HARRY ARTHUR FOOTHORAP.